United States Patent

Krauss et al.

[11] Patent Number: 5,685,280
[45] Date of Patent: Nov. 11, 1997

[54] FUEL INJECTION DEVICE FOR AN INTERNAL COMBUSTION ENGINE

[75] Inventors: Bernd Krauss, Sachsenheim; Assadollah Awarzamani, Markgroeningen; Thomas Wilfert, Ludwigsburg; Joerg Heyse, Markgroeningen, all of Germany

[73] Assignee: Robert Bosch GmbH, Stuttgart, Germany

[21] Appl. No.: 550,492

[22] Filed: Oct. 30, 1995

[30] Foreign Application Priority Data

Nov. 24, 1994 [DE] Germany .................. 44 41 792.6

[51] Int. Cl.⁶ .................... F02M 69/00; F02M 69/04; F02M 53/02; F02M 53/06
[52] U.S. Cl. ................................................ 123/549
[58] Field of Search .................. 123/549, 545, 123/552, 557, 531, 546

[56] References Cited

U.S. PATENT DOCUMENTS

| | | | |
|---|---|---|---|
| 4,378,001 | 3/1983 | Takeda et al. | 123/549 |
| 5,007,402 | 4/1991 | Scherenberg | 123/549 |
| 5,048,500 | 9/1991 | Curhan | 123/549 |
| 5,056,495 | 10/1991 | Yamashita et al. | 123/549 |
| 5,438,969 | 8/1995 | Kurr et al. | 123/549 |
| 5,449,120 | 9/1995 | Tani et al. | 123/531 |

FOREIGN PATENT DOCUMENTS

| | | |
|---|---|---|
| 1085248 | 9/1980 | Canada. |
| 0 456 535 | 11/1991 | European Pat. Off.. |
| 0 592 100 | 4/1994 | European Pat. Off.. |
| 28 43 534 | 4/1979 | Germany. |
| 3921739 | 11/1990 | Germany. |
| 6-042417 | 2/1994 | Japan. |
| 6-050242 | 2/1994 | Japan. |

*Primary Examiner*—Marguerite McMahon
*Attorney, Agent, or Firm*—Kenyon & Kenyon

[57] ABSTRACT

A fuel injection device provides a heating element that heats a fuel jet, the heating element being moved temporarily into the fuel jet downstream of a spray opening of the fuel injection valve and otherwise remaining outside the fuel jet. Improved fuel atomization of the fuel jet is thereby obtained or maintained. The fuel injection device can be used, for example, in mixture-compressing, applied-ignition internal combustion engines.

9 Claims, 3 Drawing Sheets

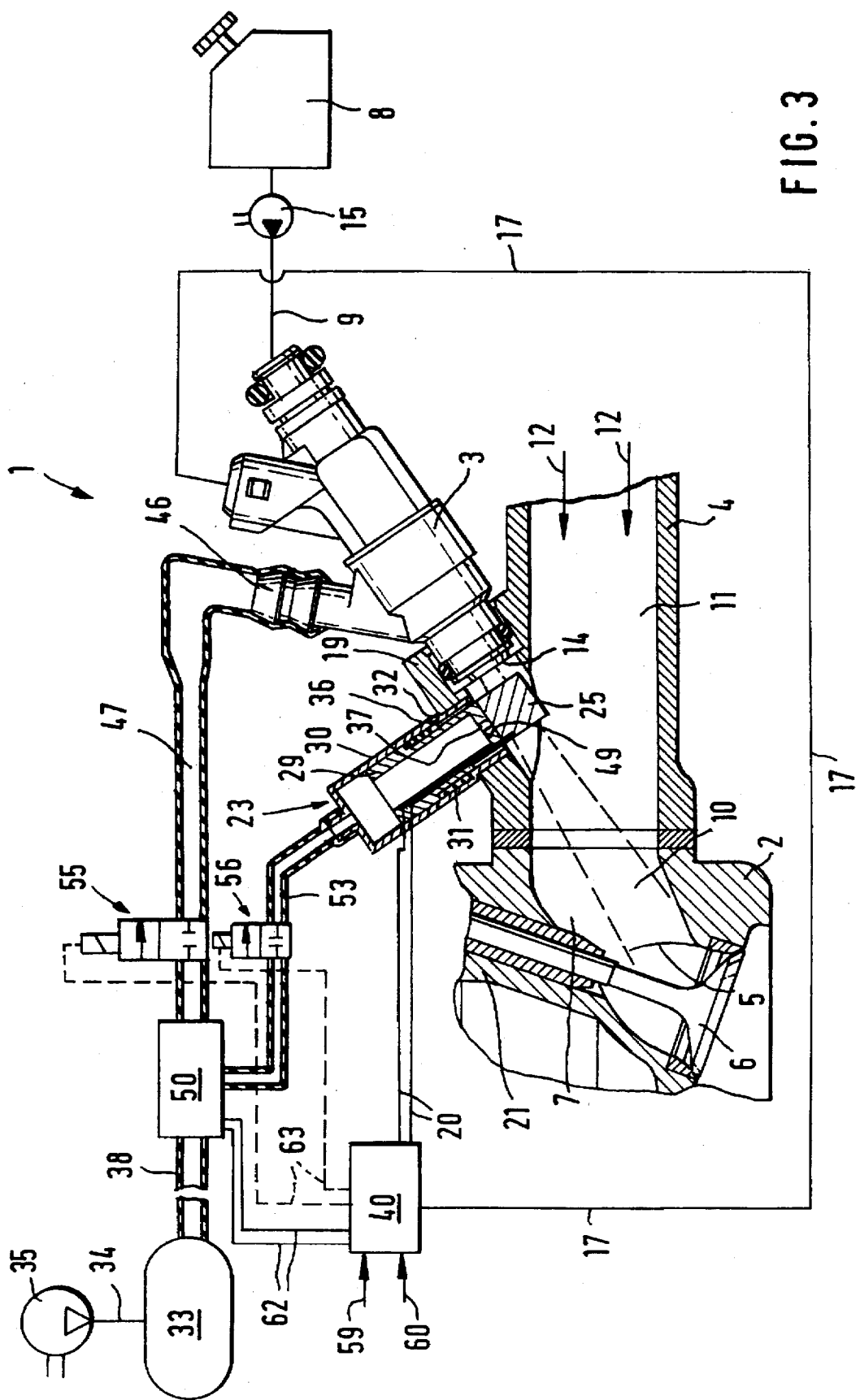

FUEL INJECTION DEVICE FOR AN INTERNAL COMBUSTION ENGINE

FIELD OF THE INVENTION

The present invention relates to a fuel injection device for an internal combustion engine.

BACKGROUND INFORMATION

German Patent No. 2843534 describes a fuel injection device in which a fuel injection valve is fitted with an electric heating element for heating up the fuel. Here, the unheated fuel first passes out of a metering opening, that can be closed by a valve-closing body and a valve seat, into a mixing passage in the fuel injection valve supplied with air taken from a throttle body, giving a fuel jet mixed with air. The fuel jet mixed with air then flows into an electric heating element which has a honeycomb structure and heats up the fuel jet together with the mixed air as it flows through the heating element.

Finally, the fuel jet, mixed with air and partially in the form of vapor, leaves the fuel injection valve through a spray opening. The fuel jet mixed with air flows through the heating element at all times, even in operating ranges in which heating of the fuel jet is not desired or when the heating element has been switched off. Because of its increased flow resistance, the fuel jet flowing through the heating element loses speed and flow momentum. With the heating element switched off, this gives rise, downstream of the spray opening, to a compact jet with undesirably large fuel droplets which tend to settle on the walls of the flow paths and cause unfavorable combustion behavior in the cylinders of the internal combustion engine.

SUMMARY OF THE INVENTION

In contrast, the fuel injection device according to the present invention has the advantage that the fuel injection valve has good fuel atomization with at least partial vaporization of the fuel jet, even in the cold-starting phase of the internal combustion engine. By virtue of the optimum way in which combustion progresses according to the present invention, particularly in the cold-starting phase and the subsequent warm-up phase of the internal combustion engine, only extremely small quantities of noxious components are formed in the exhaust gas and fuel consumption is reduced.

Moreover, there is no flow resistance to hinder the sprayed fuel jet when the heating device is switched off. As a result, fuel atomization is at an optimum at all times, advantageously allowing exhaust-gas recirculation to be initiated at an early stage due to the improved conditioning of the fuel jet, particularly after cold starting of the internal combustion engine, thereby giving a further reduction in noxious components in the exhaust gas, particularly in nitrogen oxides.

It also is advantageous that already existing fuel injection valves can be used without changes to realize the present invention, allowing rapid and inexpensive implementation of the present invention. In particular, only slight modifications to the intake pipe of the internal combustion engine are required.

BRIEF DESCRIPTION OF THE DRAWINGS

Exemplary embodiments of the present invention are depicted in simplified form in the drawing and explained in greater detail in the description which follows.

FIG. 3 shows, in partially sectioned representation, the fuel injection device in accordance with a third exemplary embodiment according to the present invention.

DETAILED DESCRIPTION OF THE INVENTION

Figure 1:
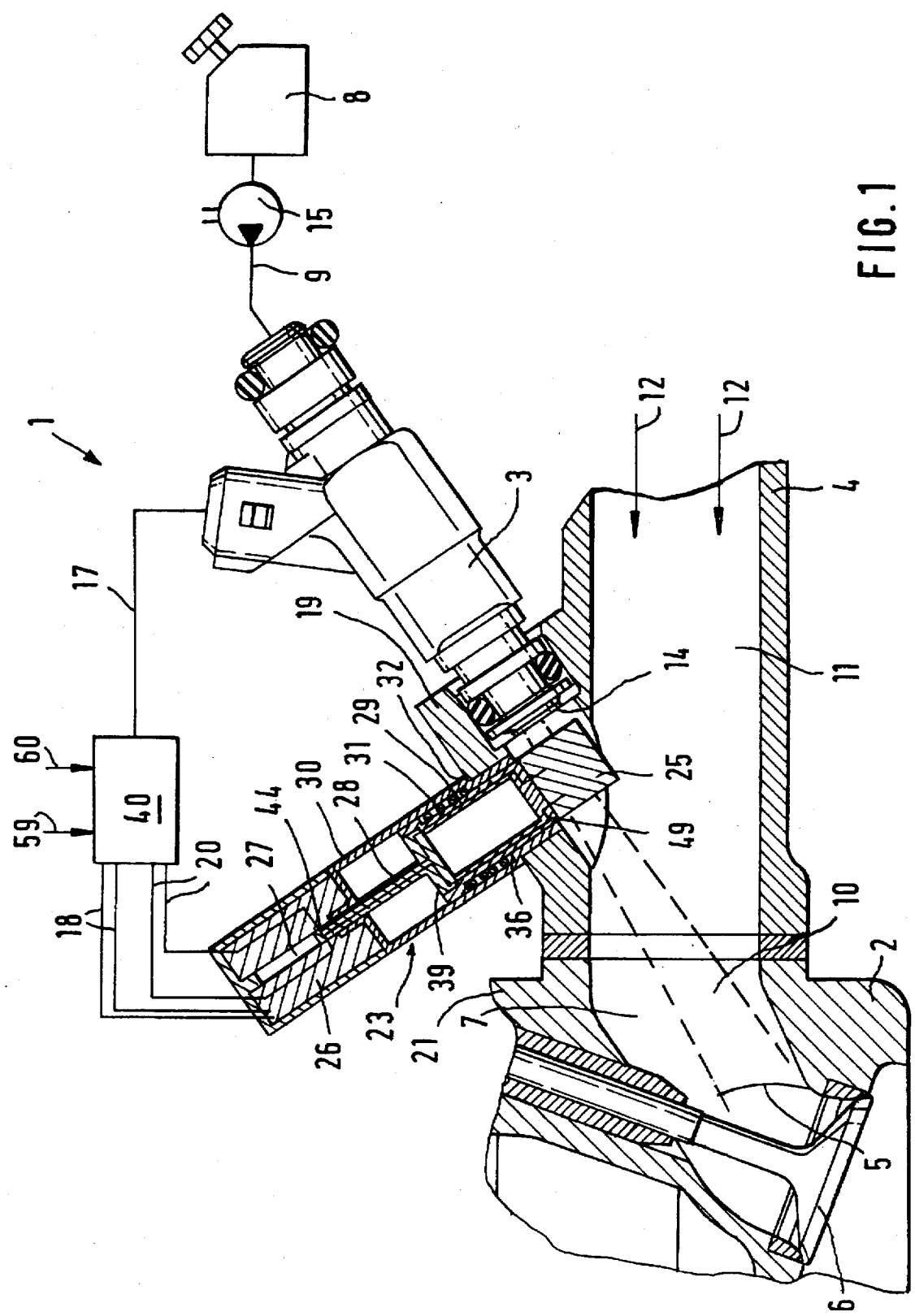
FIG. 1 shows, in partially sectioned representation, a fuel injection device in accordance with a first exemplary embodiment according to the present invention.

FIG. 1 shows, in partially sectioned representation, a fuel injection device, denoted by 1, which is provided, in particular, for a mixture-compressing, applied-ignition internal combustion engine 2, which is likewise shown in partially sectioned representation. The fuel injection device 1 has at least one fuel injection valve 3 of known design which is inserted, by means of a plug-in action for example, into an integrally formed feature 19 of an intake pipe 4 of the internal combustion engine 2. The fuel injection valve 3 is arranged in the integrally formed feature 19 in such a way that the fuel is sprayed in the direction of an inlet opening 5 of at least one inlet valve 6 of the internal combustion engine 2.

Suitable fuel injection valves 3 for this purpose are electromagnetically actuable fuel injection valves, possibly with what is referred to as an auxiliary air connection to allow a gaseous medium to be supplied to the fuel injection valve 3 via the auxiliary air connection. As a medium, it is possible, for example, to use the intake air diverted via a bypass passage upstream of a throttle valve in the intake pipe 4 of the internal combustion engine 2, air delivered by an additional blower, or even recirculated exhaust gas. The use of recirculated exhaust gas allows a further reduction in the noxious components of the exhaust gas.

Figure 2:
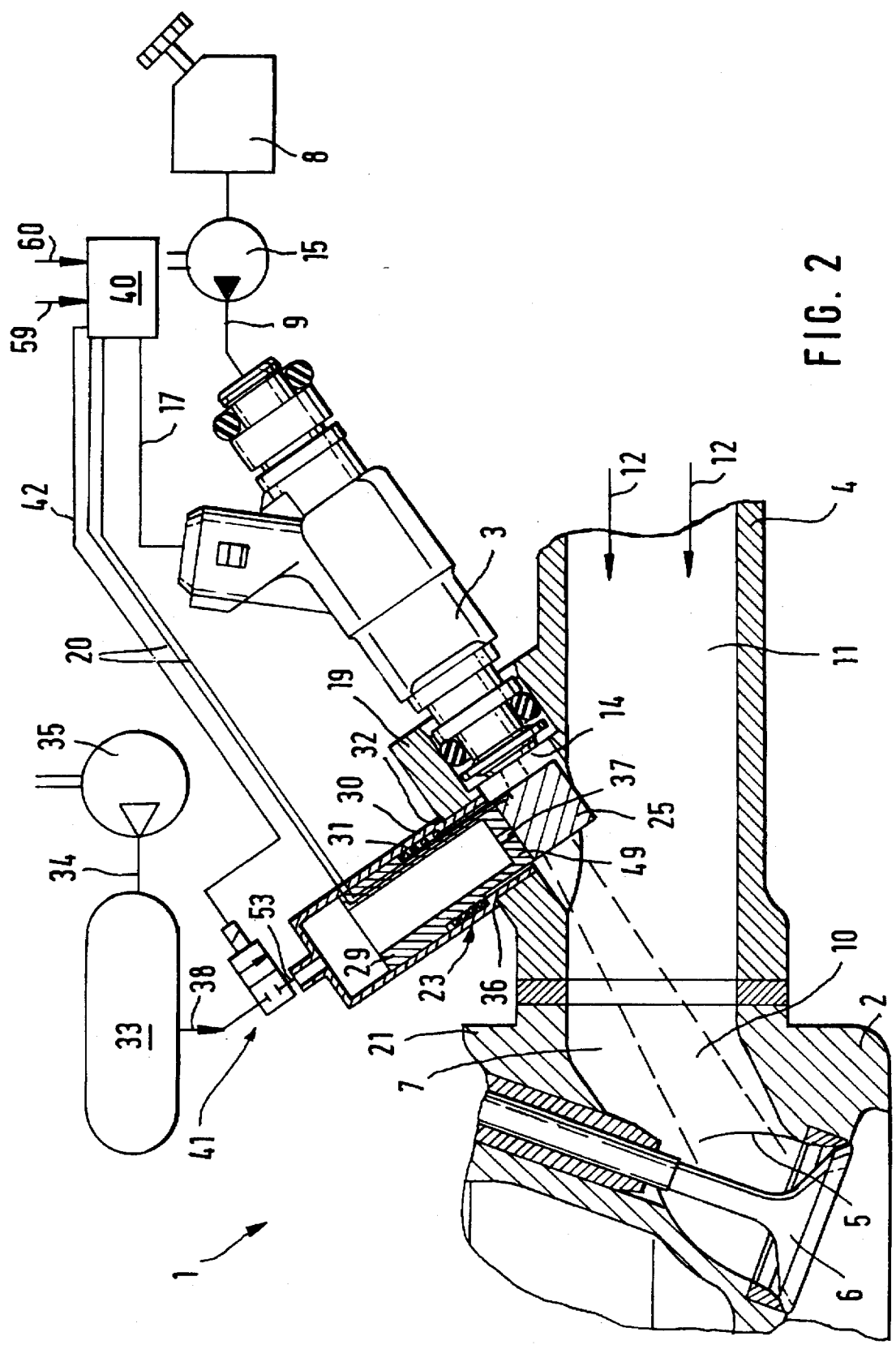
FIG. 2 shows, in partially sectioned representation, the fuel injection device in accordance with a second exemplary embodiment according to the present invention.

The inlet opening 5 is part of an inlet port 7, which is provided in a cylinder head 21 and which, as an extension of an intake duct 11 bounded by the intake pipe 4, leads to the inlet valve 6. In FIGS. 1 to 3, the intake air drawn in by the internal combustion engine 2 flows from right to left in the intake duct 11 and in the inlet port 7 along arrows 12 drawn in. In the intake duct 11, and, particularly in the inlet port 7, the intake air mixes with the fuel sprayed by the fuel injection valve 3, giving a fuel/air mixture downstream of the inlet opening 5 of the inlet valve 6 which then burns in at least one combustion space of the internal combustion engine 2. The quantity of intake air can be controlled in a known manner by a throttling member which is accommodated such that it can rotate in the intake duct 11 upstream of the fuel injection valve 3 and which takes the form of a throttle valve, for example.

For fuel supply, the fuel injection valves 3 of the internal combustion engine 2 are connected, via a common fuel distributor (or "fuel rail") for example, to a fuel feed pump 15, depicted in FIGS. 1 to 3, which pumps the fuel out of a fuel tank 8, via a fuel line 9, to a fuel distributor and from there to the individual fuel injection valves 3. In the fuel injection valve 3, the fuel is metered in a known manner by a valve-closing body, for example a valve-closing cone or a valve-closing needle and a valve seat. The fuel injection valve 3, which can be actuated, for example, electromagnetically, can be connected to an electronic control unit 40 by means of electric connection leads 17 and can be driven by the control unit 40.

The electronic control unit 40 is connected to means, for example sensors, which detect operating parameters of the internal combustion engine 2. From the evaluation of the operating parameters, it is possible to control, inter alia, the quantity sprayed by the fuel injection valves 3, thereby making possible electronic engine power control of the internal combustion engine 2, for example. The electronic control unit 40 is supplied with electrical signals 59, stemming, for example, from a throttle potentiometer which provides information on the position and change in position of the throttle valve. The electronic control unit 40 can furthermore be connected to an air mass meter, which is accommodated in the intake duct 11 of the intake pipe 4 of the internal combustion engine 2 and supplies the electronic control unit 40 with electrical signals 60 corresponding to the intake air mass flowing in the intake duct 11 of the intake pipe 4. The electronic control unit 40 also receives, inter alia, a speed signal from the internal combustion engine 2.

The fuel leaves the fuel injection valve 3 at its spraying end from a spray opening 14 in the form of a bundled, for example conical or string-shaped, fuel jet 10. According to the present invention, the fuel jet 10 leaving the spray opening 14 is heated by an electric heating element 25, but this is only introduced into the fuel jet 10 when required and otherwise remains outside the fuel jet 10. For this purpose, an extension device 23 is provided which, when required, moves the heating element 25 into the fuel jet 10 approximately transversely to the fuel jet 10 of the fuel injection valve 3, the heating element 25 thus lying more or less completely in the fuel jet 10.

The electric heating element 25 comprises, for example, a plurality of folded electric heating plates which between them form a multiplicity of flow ducts with as large a heat exchange area as possible. The individual heating plates are, for example, formed by PTC resistor elements which release heat to the fuel flowing in the flow ducts when supplied with current, owing to their positive resistance coefficient. The fuel jet 10 passes through the flow ducts of the heating element 25 and, as it flows through, is heated by the PTC resistor elements so that, after leaving the heating element 25, the fuel is essentially in the vaporized state.

The actuation of the extension device 23 is limited to the cold operation condition of the internal combustion engine 2, for example during the first 120 seconds after starting. After approximately 120 seconds, taken as an example, the internal combustion engine 2 is already in the warm-up phase, in which heating of the fuel is no longer necessary and the extension device 23 is thus actuated once again by the electronic control unit 40, for example, in order to remove the electric heating element 25 from the fuel jet 10, giving a fuel jet 10 which is unaffected and undisturbed by the heating element 25 again. The heating of the fuel jet 10 results in a reduction in the noxious exhaust components in the exhaust gas and a reduction in fuel consumption.

In the first exemplary embodiment according to the present invention shown in FIG. 1, the extension device 23 is, for example, designed to be actuated electromagnetically and can be controlled by the electronic control unit 40. The extension device 23 has, for example, one actuating magnet 26, which is of plunger-coil design and is connected to the control unit 40 via electrical connection leads 18. The actuating magnet 26 is mounted outside the intake pipe 4 on a sleeve 30 which is attached to the intake pipe 4 in the vicinity of the fuel injection valve, in the region of the integrally formed feature 19, and in which the electric heating element 25 is displacably arranged.

On the inside, the actuating magnet 26 has a central hole 27 in which a pin 28 is guided displacably by a permanent-magnetic end 44. With its end 39 opposite the actuating magnet 26, the end being, for example, T-shaped, the pin 28 is connected to a sleeve-shaped slide 29 which is accommodated displacably in the sleeve 30. The electric heating element 25 is mounted on that end 49 of the slide 29 which faces the intake duct 11.

When the extension device 23 is actuated, the slide 29 extends the heating device 25 out of the sleeve 30 by virtue of the magnetic forces exerted on the pin 28 by the actuating magnet 26, the slide 29 butting against a stop 32 provided in the sleeve 30 by its collar 36 in its end position (shown in FIGS. 1 to 3). During this process, a compression spring 31, provided between an outer surface of the slide 29 and an inner surface of the sleeve 30, is loaded. In the extended condition of the slide 29, the heating element 25 connected to the slide 29 projects from the sleeve 30 to an extent such that the spray opening 14 of the fuel injection valve 3 is covered and the fuel jet 10 thus passes completely, for example, through the heating element 25.

During or after the extension of the slide 29, the electric heating element 25 is likewise supplied with current, for which purpose use is made of electrical connecting leads 20, which lead, for example, from the slide 29 to the pin 28 and, from the latter, via the actuating magnet 26 to the electronic control unit 40. In the extended condition of the slide 29, the actuating magnet 26 remains energized in order to hold the compression spring 31 in the springloaded condition. After the actuating magnet 26 has been switched off, the slide 29 together with the heating element 25 is moved back by the spring force of the compression spring 31 into the initial position in which the heating element 25 is outside the fuel jet 10 and at least partially in the sleeve 30.

It is also possible to design the extension device 23 to be hydraulically or pneumatically actuable. One possible embodiment is described below with reference to a second exemplary embodiment according to the present invention, shown in FIG. 2, all parts which are the same or have the same action being denoted by the same reference numerals as in the first exemplary embodiment shown in FIG. 1.

FIG. 2 shows, in a partially sectioned representation of the fuel injection device 1, the electric heating element 25, which likewise has a slide 29 which can be displaced in the sleeve 30 but can be actuated by being subjected to compressed air. When the slide 29 is subjected to compressed air, it is displaced out of the sleeve 30 as far as its end position with its collar 36 resting against the stop 32 of the sleeve 30. In the extended condition of the slide 29, the electric heating element 25 is supplied with current via the electrical connecting leads 20 in order to heat up the fuel jet 10 passing through the heating element 25. If no compressed air is being applied, the compression spring 31 moves the slide 29 back into its initial position, in which the electric heating element 25 is outside the fuel jet 10 again.

To provide the compressed air, a compressed-air receiver 33 is provided, for example, which is connected by an air-receiver line 34 to a pumping device 35 and by a compressed-air line 38 and a slide compressed-air line 53 to the extension device 23. The pumping device 35 is, for example, in the form of a diaphragm-driven air pump in which the pressure fluctuations produced in a crank case of the internal combustion engine 2 by the up and down movements of a piston are used to pump the air. When the internal combustion engine 2 is running the air in the compressed-air receiver 33 can be replenished by the pumping device 35 in certain operation ranges of the internal combustion engine 2, in which, for example, no heating of the fuel jet 10 is provided, in order to provide sufficient compressed air in the compressed-air receiver 33 for further starting operations.

The compressed air flows out of the compressed-air receiver 33 in the compressed-air line 38 to a pilot valve 41, which can, for example, be actuated electromagnetically, and via the slide compressed-air line 53 into the interior of the sleeve 30 or into the interior of the slide 29. The pilot valve 41 is connected to the electronic control unit 40 by way of a control line 42, for example, in order, in the open position when driven, to open the compressed-air line 38 to the slide compressed-air line 53 and to the extension device 23, and to shut it off in the closed position. When the pilot valve 41 is open, the compressed air flows from the compressed-air receiver 33 into the interior of the sleeve 30, and from there out of a slide opening 37, for example, provided in the slide 29, and, in particular, having a flow-restricting function, to the heating element 25, whereupon the compressed air is mixed with the fuel jet 10.

The compressed air, which is supplied to the fuel jet 10 only in the heated condition of the heating element 25, brings about improved vaporization of the fuel jet 10 by virtue of more intensive and three dimensionally acting mixing of the heated compressed air, which emerges over the entire area of the heating element 25. As in the first exemplary embodiment according to the present invention shown in FIG. 1, the driving of the pilot valve 41 or the subjection to compressed air and supply of current to the electric heating element 25 is essentially limited to the cold-starting phase of the internal combustion engine 2, in particular to the first 120 seconds after starting.

However, it is also possible, in addition, to extend and supply current to the electric heating element 25 in operating ranges of the internal combustion engine 2 in which, for example, increases in noxious components in the exhaust gas occur only briefly, for example at full load. Such operating ranges can be detected by the electronic control unit 40 by means of sensors. The electronic control unit 40 here activates the extension device 23 and the electric heating element 25 only when required so as to obtain improved fuel atomization and further reduction in the noxious components of the exhaust gas by heating the fuel jet 10.

FIG. 3 shows a third exemplary embodiment of the present invention, in which all parts which are the same or have the same action are denoted by the same reference numerals as in the first and second exemplary embodiments shown in FIGS. 1 and 2. In FIG. 3, the extension device 23 is designed in accordance with the second exemplary embodiment according to the present invention shown in FIG. 2.

The fuel injection valve 3 is additionally equipped with a so-called air jacket with which auxiliary air is supplied via an auxiliary air connection 46, directly after the dispensing of the fuel jet 10 for example, in order to further improve fuel atomization by the action of the auxiliary air on the fuel jet 10. The auxiliary air connection 46 is connected by an auxiliary air line 47 to a control device 50 which is connected by the compressed-air line 38 to the compressed-air receiver 33. The control device 50 is furthermore connected, by the slide compressed-air line 53, to the interior of the sleeve 30, or the interior of the slide 29.

The control device 50 assumes functions of two individual valves 55, 56 which can also be used instead of the control device 50 and are therefore depicted in FIG. 3 only in broken lines. The control device 50 is connected by electric connecting leads 62 to the electronic control unit 40. In the same way, it is also possible to connect the valves 55, 56 to the electronic control unit 40 by way of electrical connecting leads 63, in which case the valve 55 should be provided in the auxiliary air line 47 and the valve 56 should be provided in the slide compressed-air line 53. The valves 55, 56 have, for example a variable restrictor acting so as to control the compressed air flowing in the auxiliary air line 47 or in the slide line 53.

The control device 50 or the valves 55, 56 are driven in such a way by means of the electronic control unit 40 that the slide compressed-air line 53 is supplied with sufficient pressure when the internal combustion engine 2 is cold to actuate the extension device 23 and ensure that the heating element 25 heats the fuel jet 10. It is furthermore also possible, simultaneously, for example, with the actuation of the extension device 23 or with a time delay, to actuate the valve 55 in the auxiliary air line 47, with the result that, in the open position of the valve 55, auxiliary air passes from the receiver 33 to the auxiliary air line 47 and, via the auxiliary air connection 46, into the fuel injection valve 3 in order to further improve the fuel atomization of the fuel jet 10. The supply of auxiliary air to the fuel injection valve 3 can also be continued after the switching off of the extension device 23 by means of the valve 56, with an auxiliary air quantity restricted by the valve 55 for example.

What is claimed is:

1. A fuel injection device for an internal combustion engine having an intake duct, comprising:
    at least one fuel injection valve having a spray opening for spraying fuel into the intake duct as a fuel jet; and
    a fuel heating element movably disposed adjacent to the spray opening, the fuel heating element moving between a first position outside of the fuel jet and of the intake duct and a second position at least partially within the fuel jet and substantially outside of the intake duct.

2. The fuel injection device according to claim 1, wherein the fuel heating element includes an electric heating element.

3. The fuel injection device according to claim 2, wherein the electric heating element further includes a plurality of resistor elements, the plurality of resistor elements forming a plurality of flow ducts, the plurality of flow duct forming a large heat exchange area.

4. The fuel injection device according to claim 2, further comprising:
    a slide element connected to the electric heating element and movably disposed in a sleeve, the slide element being movably actuated by an electromagnetic circuit.

5. The fuel injection device according to claim 2, further comprising:
    a slide element connected to the electric heating element and movably disposed in a sleeve, the slide element being movably actuated by compressed air.

6. The fuel injection device according to claim 4, wherein the electromagnetic circuit includes an actuating magnet connected to an electronic control unit, the actuating magnet exerting an electromagnetic force for moving the fuel heating element.

7. The fuel injection device according to claim 5, wherein the compressed air is provided to the slide element via a valve.

8. The fuel injection device according to claim 1, further comprising an auxiliary air jacket coupled to the at least one fuel injection valve for supplying auxiliary air into the fuel jet, the auxiliary air being controlled by a valve.

9. A fuel injection device for an internal combustion engine having an intake duct, comprising:

at least one fuel injection valve having a spray opening for spraying fuel into the intake duct as a fuel jet; and a fuel heating element movably disposed downstream of the spray opening, the fuel heating element moving between a first position outside of the fuel jet and of the intake duct and a second position at least partially within the fuel jet, wherein compressed air is released from the fuel heating element only in a heated condition of the fuel heating element, and the compressed air is mixed with the fuel jet.

* * * * *